United States Patent [19]

Buegel

[11] Patent Number: 5,215,360
[45] Date of Patent: Jun. 1, 1993

[54] TRACEABLE TRACKED VEHICLE LICENSING SYSTEM

[76] Inventor: John F. Buegel, P.O. Box 1252, Grand Forks, N. Dak. 58206-1252

[21] Appl. No.: 821,185

[22] Filed: Jan. 15, 1992

[51] Int. Cl.[5] ............................................. B62D 55/26
[52] U.S. Cl. ........................................ 305/54; 305/60; 101/328
[58] Field of Search ................... 305/35 R, 35 EB, 38, 305/39, 51, 54, 60; 101/103, 111, 263, 328, 329; 40/587, 616, 910

[56] References Cited

U.S. PATENT DOCUMENTS

| | | |
|---|---|---|
| 512,937 | 1/1894 | Bergeman . |
| 645,855 | 3/1900 | Wright . |
| 725,205 | 4/1903 | Blount . |
| 994,971 | 6/1911 | Beck . |
| 1,075,555 | 10/1913 | Felix ................................. 101/328 |
| 1,092,749 | 4/1914 | Ryan . |
| 1,093,310 | 4/1914 | Carkhuff ......................... 101/328 X |
| 1,707,149 | 3/1929 | Stamper .......................... 101/328 X |
| 2,866,992 | 10/1954 | Toulmin, Jr. ...................... 15/131.05 |
| 3,516,339 | 5/1968 | Perkins ................................. 94/45 |

FOREIGN PATENT DOCUMENTS 2600243 7/1977 Fed. Rep. of Germany ........ 305/54
365040 11/1938 Italy .................................... 101/328

*Primary Examiner*—Russell D. Stormer
*Attorney, Agent, or Firm*—Zarley, McKee, Thomte, Voorhees & Sease

[57] ABSTRACT

A tracked vehicle identification includes an identification code formed in the tread of a tracked vehicle so as to leave an imprint on the ground. A second embodiment of the invention includes a plate affixed to the vehicle track with apertures therein to form an identifiable imprint in the ground with predetermined positioning of the apertures. A template with apertures therein is utilized to locate a predetermined sequence of apertures in the plate or in the vehicle tread in properly spaced alignment. A clipboard with apertures matching those of the template is utilized to cover an imprint in the ground and indicate the positioning of the code marked in the imprint. An evidence recording form on the clipboard is then marked with the sequence of apertures showing through the apertures in the clipboard so as to identify the tracked vehicle.

8 Claims, 4 Drawing Sheets

TRACEABLE TRACKED VEHICLE LICENSING SYSTEM

TECHNICAL FIELD

The present invention relates generally to identification plates for vehicles, and more particularly to an improved method and apparatus for applying identification coding to a tracked vehicle.

BACKGROUND OF THE INVENTION

In areas where snow is a common occurrence, tracked vehicles such as snowmobiles and the like are commonly used for entertainment and transportation. While some locations require license plates or decals mounted on the body of such vehicles for identification purposes, the current method of tracing such vehicles has several drawbacks.

In the case of reckless operation of the vehicle, or use of the vehicle in vandalizing or burglarizing unoccupied structures, it is impossible to identify the specific vehicle used during the wrongful act unless the vehicle is seen by a passerby.

It is therefore a general object of the present invention to provide a tracked vehicle licensing system which provides identification of a vehicle in the vehicle's track.

A further object of the present invention is to provide an improved method for identifying track vehicles. These and other objects will be apparent to those skilled in the art.

SUMMARY OF THE INVENTION

The tracked vehicle identification of the present invention includes an identification code formed in the tread of a tracked vehicle so as to leave an imprint on the ground. A second embodiment of the invention includes a plate affixed to the vehicle track with apertures therein to form an identifiable imprint in the ground with predetermined positioning of the apertures. A template with apertures therein is utilized to locate a predetermined sequence of apertures in the tread or in the plate in properly spaced alignment. A clipboard with apertures matching those of the template is utilized to cover an imprint in the ground and indicate the positioning of the code marked in the imprint. An evidence recording form on the clipboard is then marked with the sequence of apertures showing through the apertures in the clipboard so as to identify the tracked vehicle.

DESCRIPTION OF THE PREFERRED EMBODIMENT

Figure 1:
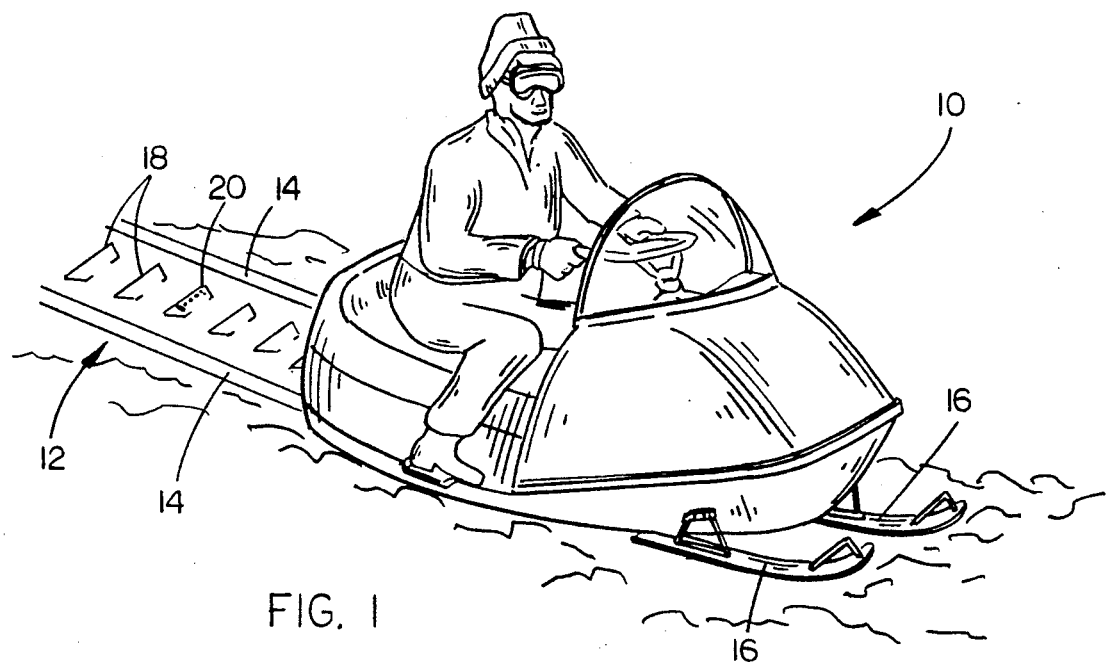
FIG. 1 is a pictorial view of a snowmobile having the identification plate of the present invention installed thereon.

Referring now to the drawings, in which similar or corresponding parts are identified with the same reference numeral, and more particularly to FIG. 1, a snowmobile 10 is shown as one example of a tracked vehicle for which the identification system of the present invention is designed. As shown in FIG. 1, the snowmobile 10 will leave an imprint 12 in the snow, with a pair of trails 14 formed by the skis 16 on the snowmobile, and a plurality of spaced-apart depressions 18 formed by the endless loop track (not shown) of the snowmobile 10. One particular depression is identified generally at 20 and will be referred to as the "footprint" of snowmobile 10, since identifying information is imparted in footprint 20.

Figure 3:
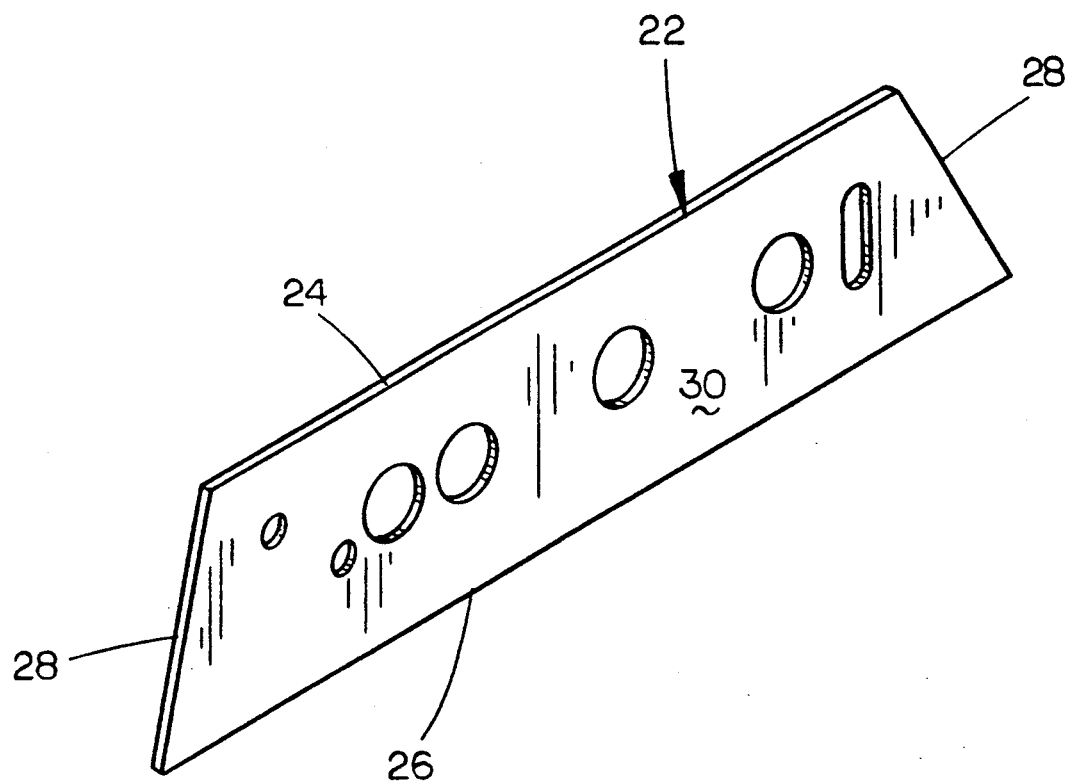
FIG. 3 is a perspective view of a plate which may be attached to a vehicle track.

FIG. 3 shows an imprinting plate 22 which may be attached directly to the track of a vehicle so as to create a footprint 20 In addition, the coded information could be formed directly in one cleat of the track, as described hereinbelow. Plate 22 includes an upper edge 24 lower edge 26 and side edges 28, as well as a front surface 30 and a rearward surface 32 (not shown). Plate 22 is affixed to a snowmobile track by rivets, screws, or any other convenient method, so that upon each complete revolution of the vehicle track, plate 22 will be imprinted into the snow or ground so as to imprint the identification code formed in the plate.

Figure 4:
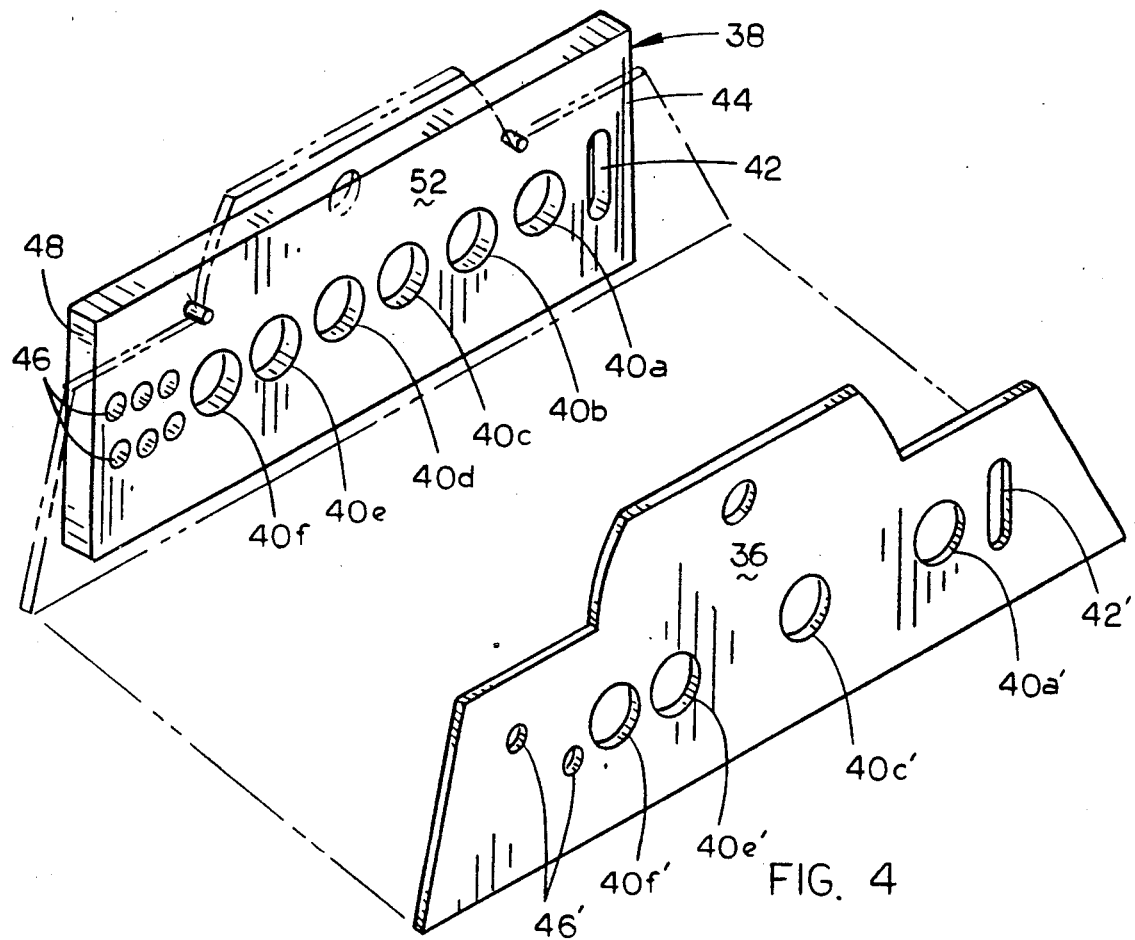
FIG. 4 is a perspective view of a jig utilized for creating the identification code in a vehicle track with a marking decal.

The preferred method of the invention includes an identification code which is formed in the plate 22 by drilling apertures through the plate. A binary numbering system is able to indicate a number by the presence or absence of marks in a series of predetermined locations. Obviously, plate 22 may alternatively utilize an identification code of alphanumeric characters, which are either embossed or formed in relief on plate 22. A drilling template 38 is shown in FIG. 4 which has six large round apertures 40 equally spaced along the longitudinal center line of the rectangular template 38. A vertically oriented slot 42 is formed between one end of the line of apertures 40 and the right end 44 of template 38 to identify the right end of the code sequence. A series of small holes 46 are drilled between the left end of the line of apertures 40 and left edge 48 of template 38. Preferably, two horizontal rows of three holes 46 are formed through template 38 to identify the left end of the sequence of apertures 40, as well as provide a separate code location for separate information. In this instance, holes 46 are utilized to identify a state, province, county or other geographical or political entity while large apertures 40 are utilized to indicate a numeral. One or more of holes 46 may be utilized to present a distinct arrangement to represent a state name, while the numeral may be represented by drilling an aperture 40 in a location representing a column in the binary numbering system.

If the binary numbering system is utilized, aperture 40*a* would represent the number "1", aperture 40*b* would represent the number "2", aperture 40*c* would represent the number "4", aperture 40*d* would represent the number "8", aperture 40*e* would represent the number "16", and aperture 40*f* would represent the number "32". A decal 36 is shown in FIG. 4, with apertures therethrough which correspond with apertures 40*a*, 40c, 40e and 40f of template 38, which are identified at 40a', 40c', 40e' and 40f'. Using the binary numbering system this arrangement would indicate the number "53". A vertical slot 42, corresponds with slot 42 in template 38, to indicate the right end of the code sequence. Holes 46' represent two of the holes 46 of template 38 and indicate the left end of the number sequence, as well as a state identification.

Figure 5:
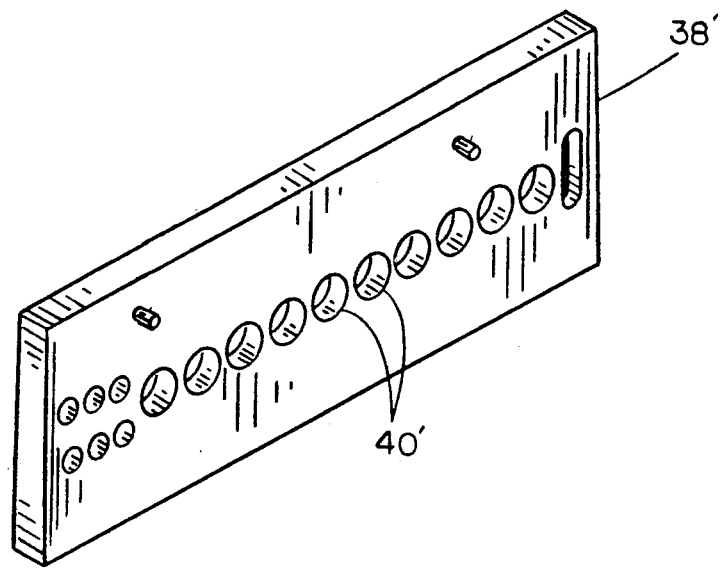
FIG. 5 is a pictorial view of a second embodiment of a jig with an identification code formed therein.

As shown in FIG. 4, a template having six apertures 40 is capable of registering a number up to "63", utilizing the binary system. FIG. 5 shows a second embodiment of the template 38' with ten apertures 40', thereby permitting the identification of a number as high as "1,023". Adding more apertures 40' increases the potential numbers that can be identified.

Decal 36 may be used in a number of ways. In the preferred form of the invention, decal 36 is placed on template 38, as shown in FIG. 4, which is then placed directly on a cleat of a vehicle track. Apertures, or depressions, are then formed directly in the cleat, as described in detail hereinbelow. Decal 36 and template 38 may also be used to form identification code in plates 22 which are then fastened to the vehicle. Utilizing decal 36 on the snowmobile 10 of FIG. 1, the imprinted code would be as shown in footprint 20 of FIG. 2.

Figure 6:
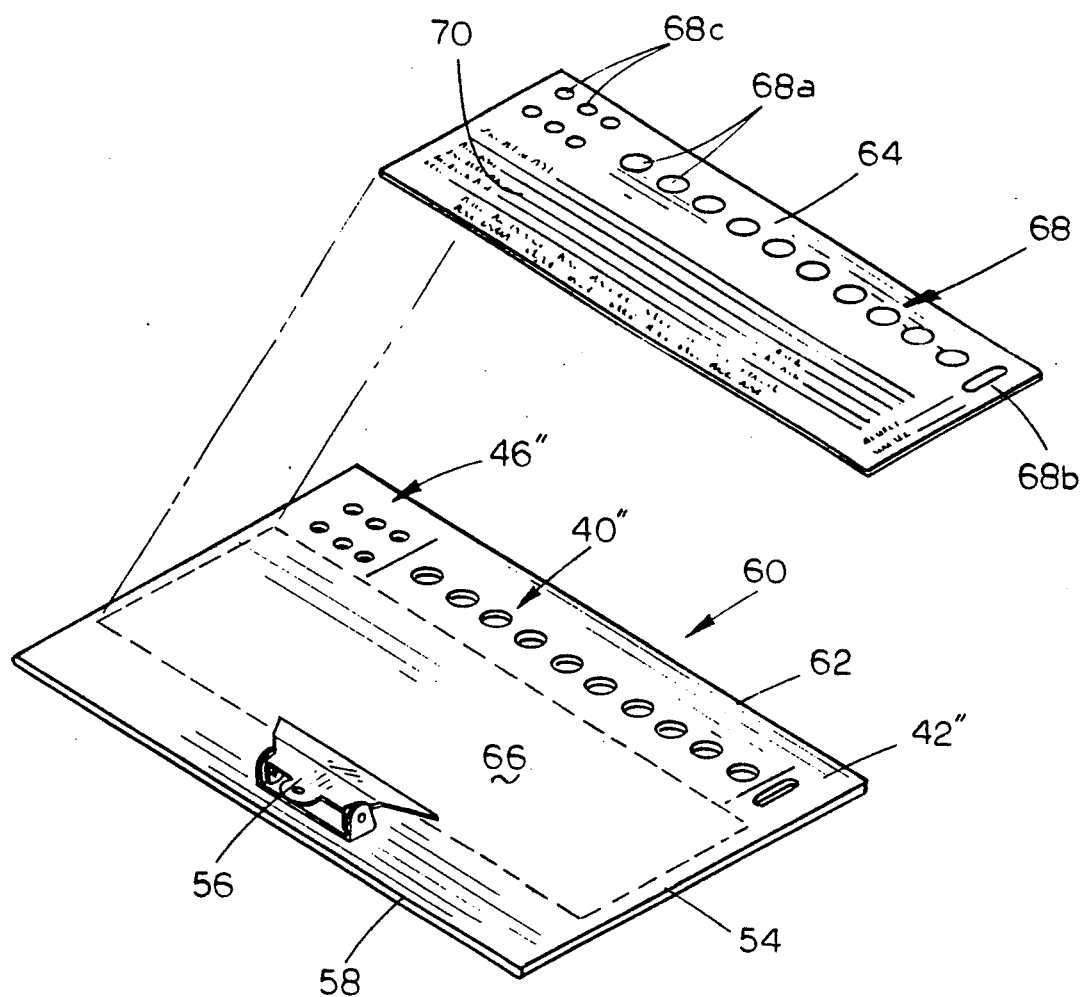
FIG. 6 is a pictorial view of an identification clipboard with an evidence marking form attachable thereto.

Referring now to FIG. 6, a clipboard 54 is shown with an operable clip 56 mounted along one longitudinal edge 58 thereof. A full set of identification apertures 60 are formed along the opposing longitudinal edge 62, corresponding with apertures 40, slot 42, and holes 46 on template 38 (see FIG. 4). Thus, identification clipboard 54 has a series of apertures 40", a slot 42" and holes 46".

An evidence recording form 64 is removably clipped to the upper surface 66 of clipboard 54 under clip 56. Printed indicia 68 on form 64 corresponds with the exact positioning of the identification codes 60 on clipboard 54. Thus, indicia 68a corresponds with apertures 40", indicia 68b corresponds with slot 42", and indicia 68c corresponds with holes 46". Other printed matter 70 on evidence form 64 is utilized to record pertinent information with respect to the officer recording the information, the location of the tracks and other pertinent information.

Figure 2:
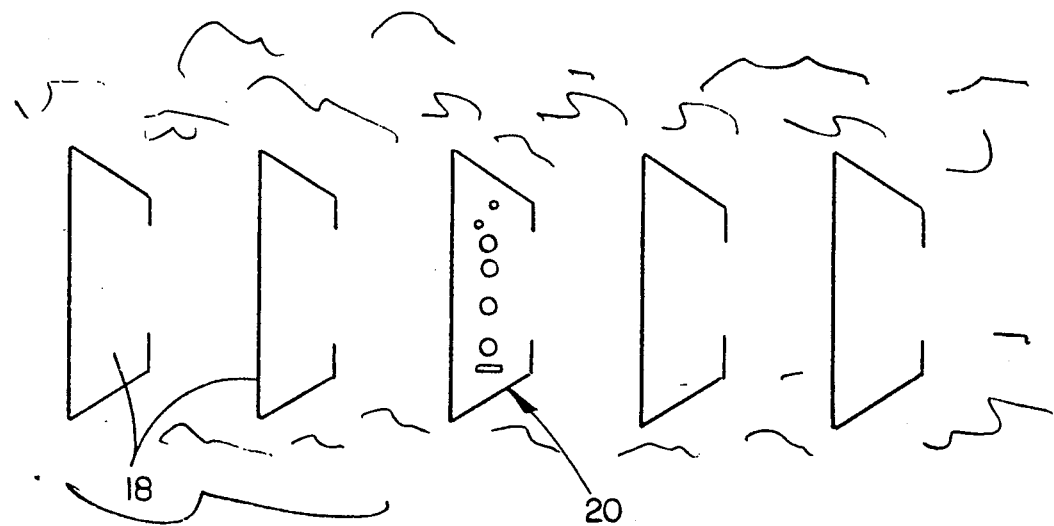
FIG. 2 is a top view of the track produced by the snowmobile of FIG. 1.

When a law enforcement officer is called to a location to investigate snowmobile tracks, the clipboard 54 and evidence recording form 64 are utilized. Upon finding the snowmobile tracks, as shown in FIG. 2, the clipboard may be placed over the top of the identifying "footprint" so as to indicate the particular spacing of the identification markings. The evidence recording form may then be directly marked showing the identification code from the footprint.

Figure 7:
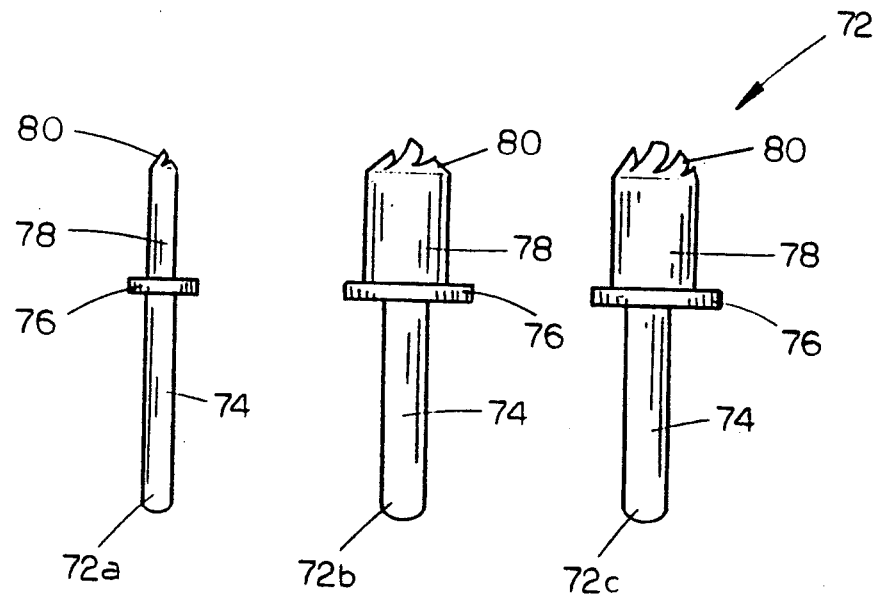
FIG. 7 is a side elevational view of three drill bits utilized in forming an identification code in a vehicle track.

Referring now to FIG. 7, drill bits 72 are utilized to form apertures or dimples in the vehicle tread. Drill bit 72a is utilized to form holes 46, drill bit 72b may be utilized to form apertures 40, and drill bit 72c may be used to form slot 42. Each drill bit 72 includes a shaft 74 with a radially projecting flange 76. A shank 78 projects coaxial with shaft 74 from flange 76, and has a length equal to the thickness of template 38. In this way, the tooth portion 80 of drill bits 72 will form a depression in a vehicle track or in plate 22 of the desired depth.

Whereas the invention has been shown and described in connection with the preferred embodiment thereof, it will be understood that many modifications, substitutions and additions may be made which are within the intended broad scope of the appended claims. For example, raised letters or numbers may be utilized in place of the binary code system described herein. Similarly, the identification code could be formed directly in the vehicle track rather than on a plate attached to the track. In addition, an identification code may be incorporated in the vehicle track at the point of manufacture. There has therefore been shown and described an improved track vehicle identification system which accomplishes at least all of the above stated objects.

I claim:

1. A tracked vehicle identification system for snowmobiles, comprising:
   a snowmobile with a means of propulsion that consists of a single track in contact with snow;
   an identification plate of a size and shape for attachment to the track of a tracked vehicle for movement therewith;
   said plate having means thereon for leaving an identifiable imprint in the snow which is different than the track imprint formed in the snow when the vehicle passes over the snow.

2. The system of claim 1, wherein said means for leaving an imprint includes a plurality of apertures formed in said plate at predetermined locations to leave raised portions in the surface of the snow to indicate a predetermined numeral.

3. The system of claim 2, wherein said apertures are formed along a horizontal line and located in a predetermined position, so as to leave raised portions and unraised portions in an imprint in the ground.

4. The system of claim 3, wherein said apertures form a sequence having a left end and a right end and further comprising means in said plate adjacent the right end of said apertures to indicate the right end of the sequence.

5. The system of claim 4, further comprising means in said plate adjacent to the left end of said apertures, to indicate the left end of the sequence.

6. The system of claim 2, further comprising a template having apertures formed therethrough upon which a plate is placed to drill apertures at predetermined locations.

7. A tracked vehicle identification system for snowmobiles, comprising:
   an identification plate of a size and shape for attachment to the track of a tracked vehicle for movement therewith;
   said plate having means thereon for leaving an identifiable imprint different than the track imprint in the ground surface when the vehicle passes over the ground;
   said means for leaving an imprint including a plurality of apertures formed in said plate at predetermined locations to leave raised portions in the ground surface to indicate a predetermined numeral;
   a template having apertures formed therethrough upon which a plate is placed to drill apertures at predetermined locations;
   a rectangular rigid board having an upper surface, a first longitudinal edge, and an opposing second longitudinal edge;
   means for removably attaching a form sheet to the upper surface of said board; and
   apertures formed along the first longitudinal edge of said board at predetermined location corresponding to apertures formed in said template, to identify an imprint left on the ground by said identification plate.

8. The system of claim 7, further comprising an evidence recording form having printed indicia thereof corresponding with the apertures in said board, said form removably connected to said board immediately adjacent said board aperture, whereby an imprint in the ground may be marked on the form by aligning the imprint with the apertures in the board for reference.

* * * * *